Figure 1:
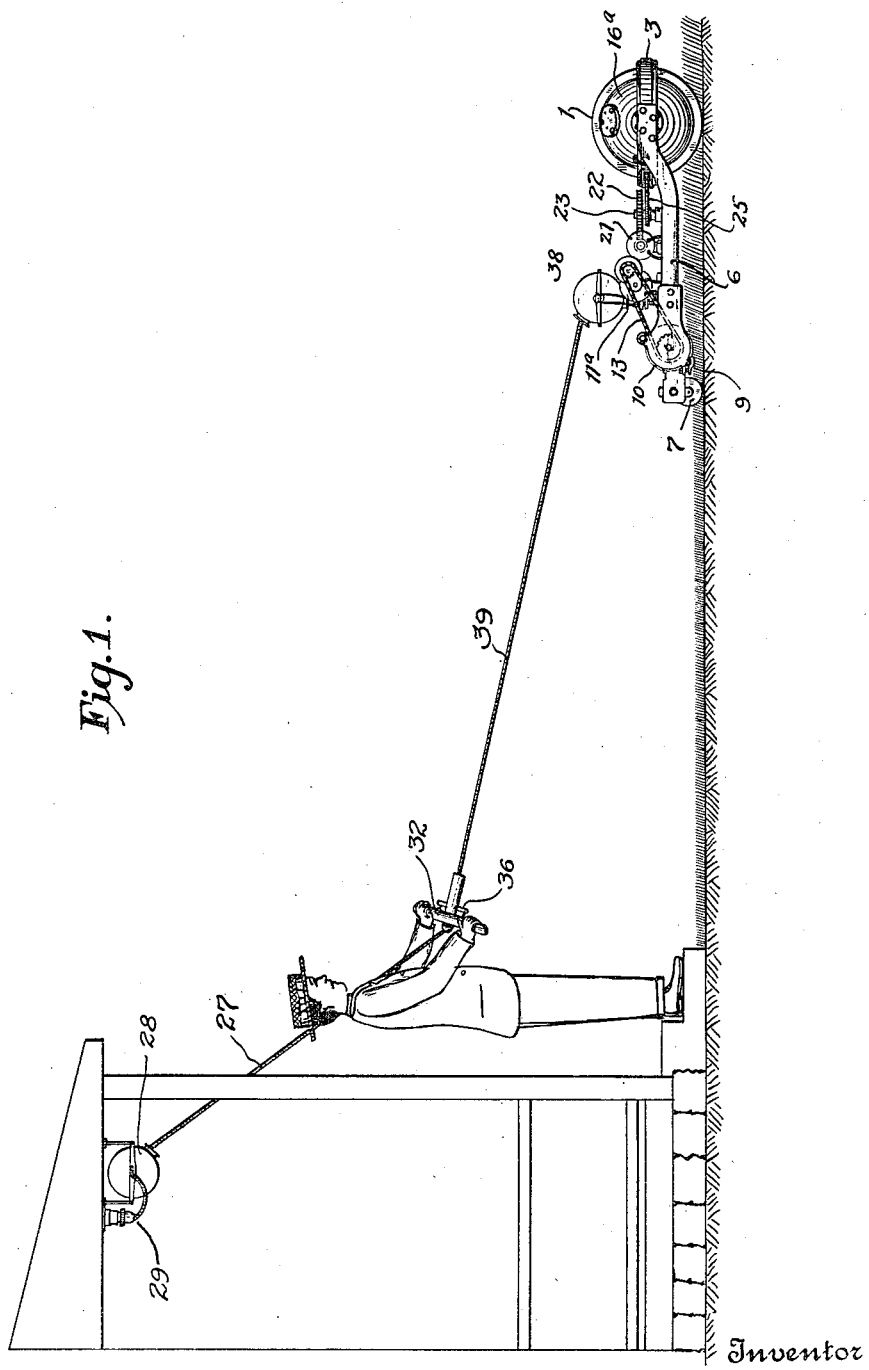

July 10, 1923.

J. W. PETERS

LAWN MOWER

Filed March 2, 1921

1,461,323

5 Sheets-Sheet 1

Inventor

John W. Peters.

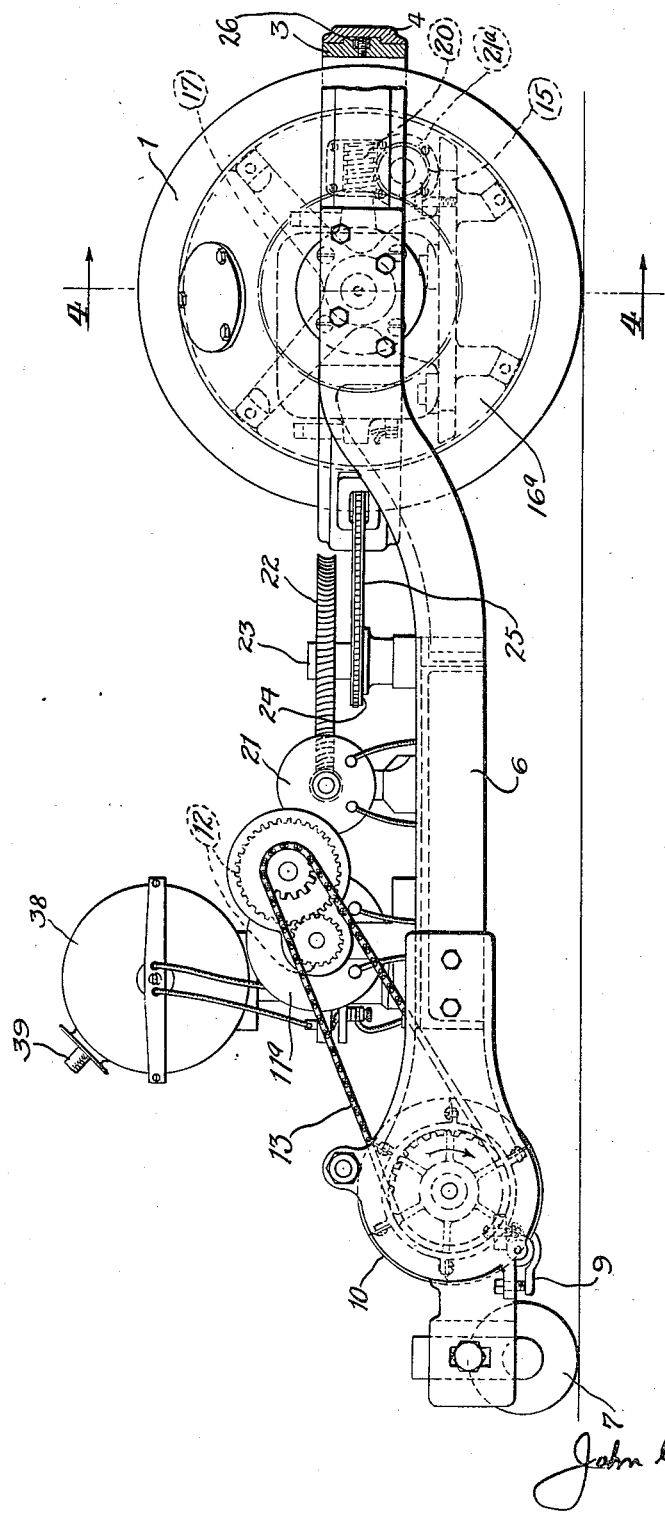

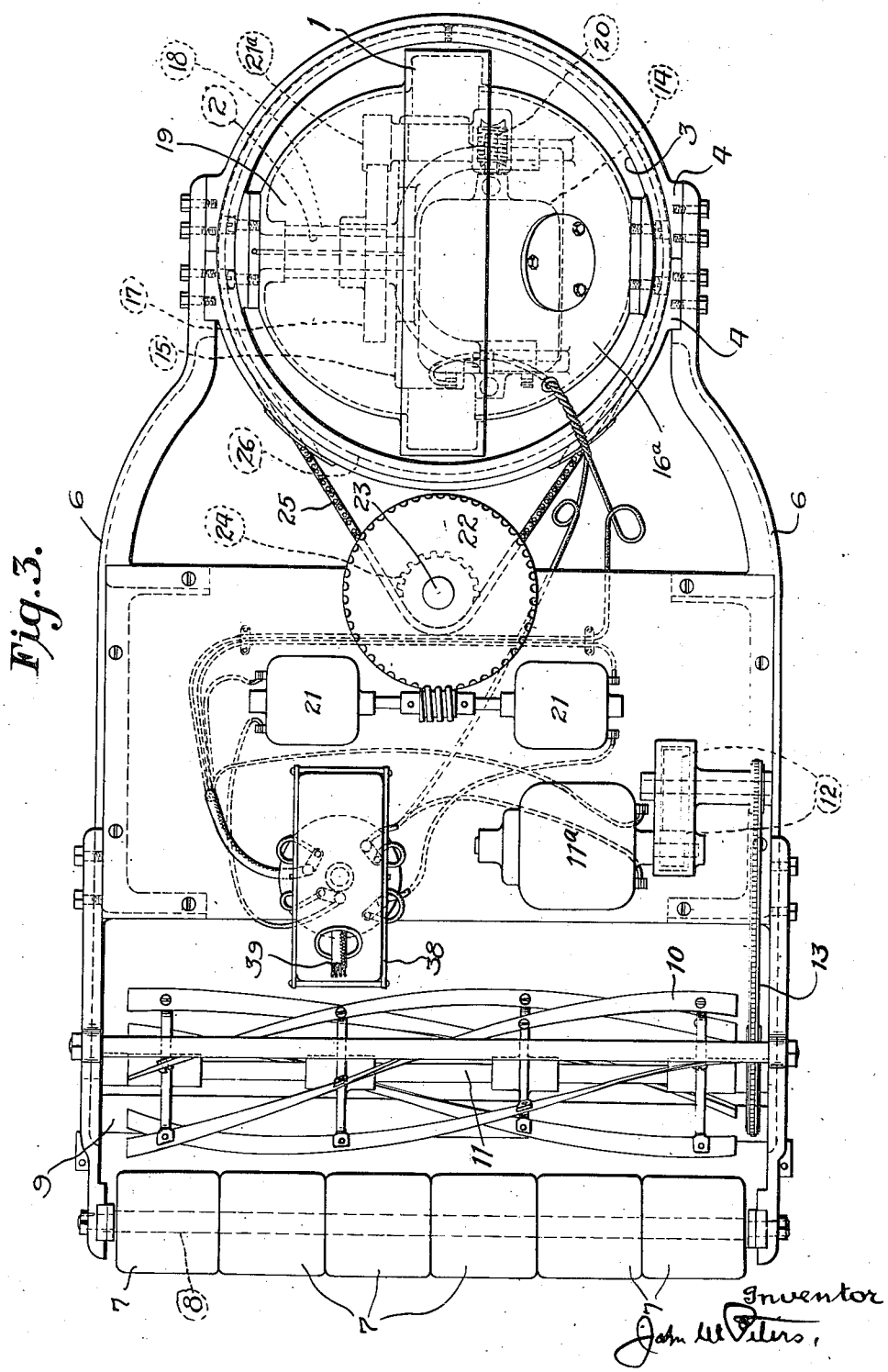

July 10, 1923. 1,461,323
J. W. PETERS
LAWN MOWER
Filed March 2, 1921 5 Sheets-Sheet 4
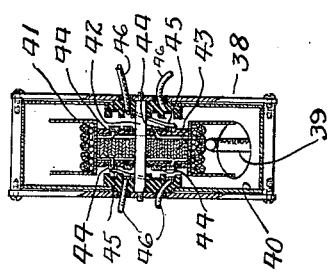
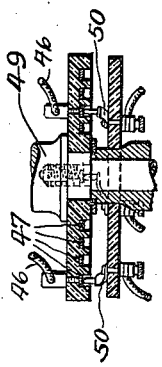
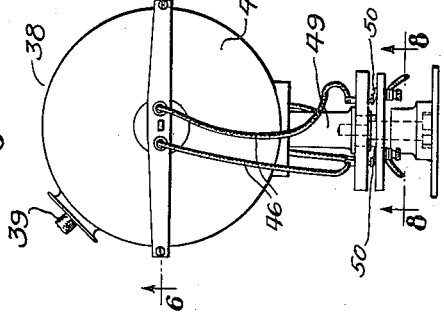
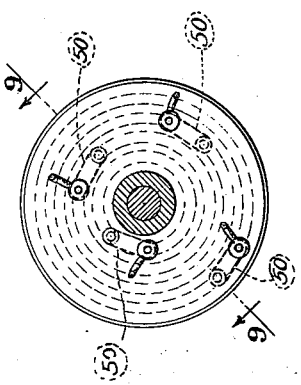
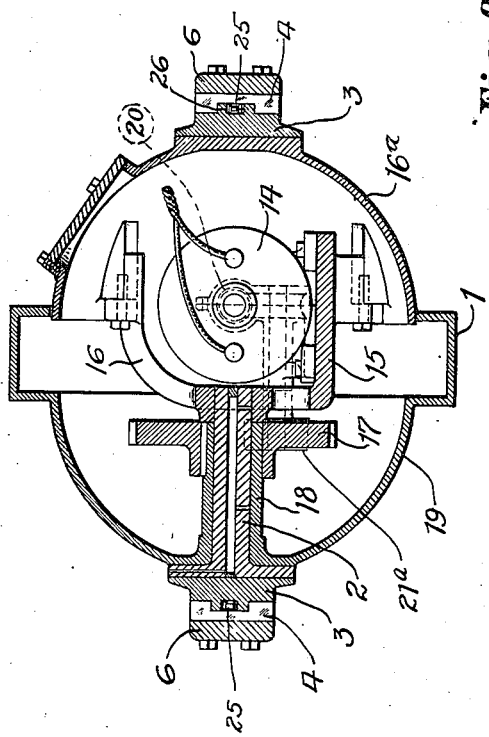
Inventor
John W. Peters,

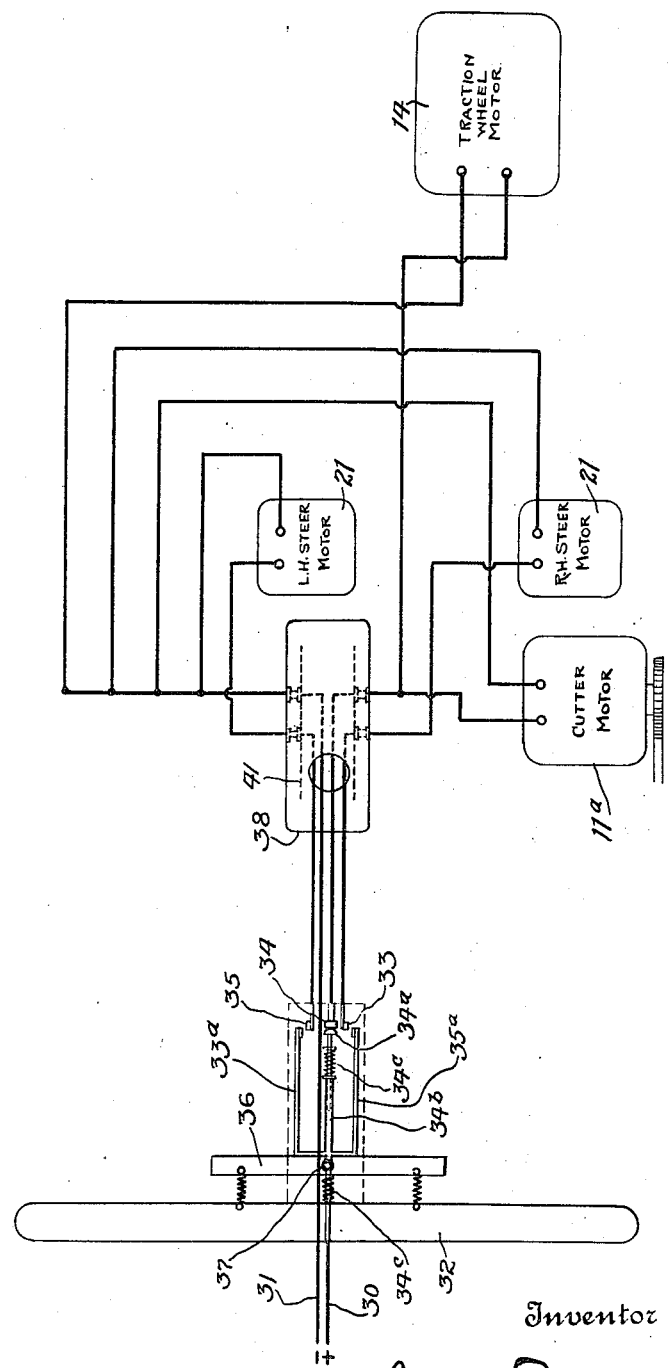

Patented July 10, 1923.

1,461,323

UNITED STATES PATENT OFFICE.

JOHN W. PETERS, OF ROSLYN, NEW YORK.

LAWN MOWER.

Application filed March 2, 1921. Serial No. 449,259.

*To all whom it may concern:*

Be it known that I, JOHN W. PETERS, a citizen of the United States, residing at Roslyn, county of Nassau, and State of New York, have invented certain new and useful Improvements in Lawn Mowers, of which the following is a disclosure.

My invention relates to self-propelled lawn mowers of a type adapted to be stopped, started, steered and controlled by the operator electrically through a flexible multi-conductor cable, preferably secured to a self-winding reel on the machine and of such length that the operator can control the operation of the machine over considerable distances and is not required to follow it throughout its movement in the operation of cutting a lawn.

In the drawing accompanying and forming a part of this specification I have illustrated the preferred embodiment of my invention. Fig. 1 shows the mower in operation and the system of current supply and distant control. Fig. 2 is a side elevation of the mower. Fig. 3 is a plan view. Fig. 4 is a section view of the propelling wheel taken on the line 4—4 of Fig. 2. Fig 5 is a side elevation of the self-retracting spring reel which functions to reel in and out the cable through which the machine is controlled and operated. Fig. 6 is a sectional view through the drum of the reel. Fig. 7 is a detail view of one of the contact plates of the drum. Fig. 8 is a view partly in section taken on line 8—8 of Fig 5, showing the construction of the sliding contacts forming a part of the base of the reel. Fig. 9 is a sectional view on the line 9—9 of Fig. 8. Fig. 10 is a wiring diagram.

Referring in detail to the drawing, the machine comprises a combined propelling and steering wheel 1, mounted to turn on axle 2 which is secured at one end to the ring or fifth wheel 3. This fifth wheel is mounted to turn freely in the split ring 4 which is mounted in and forms a part of the frame 6 of the machine. At the rear end of the machine there are rollers 7 mounted to roll freely and independently of each other on the shaft 8. This shaft is adjustable as to elevation and functions to maintain the cutter bar 9 at the desired elevation above the ground. The rotatable knives 10 are mounted on shaft 11 and are driven by a small electric motor 11$^a$ operating through gears 12 and chain 13.

For driving the wheel 1 I provide a small electric motor 14. This is mounted on a bracket 15 secured by spiders 16 to the fixed housing 16$^a$ bolted to the fifth wheel 3. The motor drives the gear 17 fixed on hub 18 of rotatable housing 19, through worm gear 20 and pinion 21$^a$. The two cup-shaped housing members 16$^a$ and 19, one fixed and the other rotatable completely enclose and protect the motor 14 and form a large hub for the wheel. In order to steer the machine I provide two small motors 21 mounted to drive worm wheel 22, one in one direction and the other in the other direction. Wheel 22 is mounted on spindle 23 and has fixed to it a sprocket 24. The chain 25 passes around sprocket 24 and is disposed in groove 26 of wheel 3, so that it functions to steer the wheel either to the right or left when one of the motors 21 is brought into operation. It may also be used for reversing the machine as by turning wheel 1 through 180 degrees.

In operating the machine the current is preferably obtained from the house circuit as by means of a cable 27 extending from a reel 28 of any suitable construction located at a socket 29, to the operator (see Fig. 1). The cable extending to the operator is a two wire cable (see conductors 30 and 31, Fig. 10). The operator controls the machine through a switch comprising a handle 32 and three fixed contacts 33, 34 and 35. A movable contact 34$^a$ controls the current flowing to the cutter motor and the traction wheel motor. This contact is mounted on a shaft 34$^b$ and is normally held closed by springs 34$^c$. The arm 36 is pivoted at 37 to the shaft 34$^b$. This shaft carries two contacts 33$^a$ and 35$^a$ and by rocking the arm 36 in the desired direction either of these contacts may be brought into operation, thereby energizing one of the steering motors 21 and turning the motor in the desired direction. In practice it is convenient for the operator to keep one finger on the extension of arm 36 to the right of the pivot 37 and another finger, preferably of the other hand, on the opposite extension. This gives a quick means of controlling the direction of travel, and in addition when both ends of 36 are pulled down at the same time, rod 34ᵇ is retracted, breaking the contact 34—34ᵃ. Hence the operator, by slight movements of only two fingers, can exert instant control over all movements of the machine.

The reel 38 on which the four-wire cable 39 is wound comprises a housing 40 in which the drum 41 is mounted on spindle 42. This drum is retracted, or turned so as to wind up the cable by the spring 43. The four wires forming the cable terminate in four slip rings 44, two on each side of the reel. Fixed brushes 45 bear on these slip rings (see Fig. 7) and conductors 46 lead from the brushes to four slip rings 47 on the plate 48 fixed on the vertical shaft 49. Fixed brushes 50 bear on the slip rings 47 and from these brushes the conductors lead to the several motors as shown in Fig. 10.

Many modifications may be made in the machine as described without departing from the scope of my claims. In particular I call attention to my application filed of even date herewith, Serial No. 449,260, wherein I have disclosed several features of invention above described as applied to a machine propelled by a gas engine. Where the same features or arrangements are common to the two applications I claim them broadly in this application and elect to make the other application specific as to such common subject matter.

Having now described my invention, what I claim is:

1. A lawn mower a propelling motor thereon, a flexible cable extending from the mower to a switch under the control of the operator, said switch functioning to stop and start the propelling motor and to control the direction of travel of the mower, and a flexible cable extending from the operator to a source of current supply.

2. A lawn mower comprising in combination with a frame and supporting rollers a propelling motor, electrically controlled steering mechanism, means for supplying current to the motor and steering mechanism comprising a flexible cable extending from a fixed source of current supply to a control switch adapted to be held in the operator's hand, and a second cable extending from the switch to the mower.

3. A lawn mower comprising motors for propelling and steering the mower, a self-winding reel mounted on the mower, a control switch for said motors, a flexible cable secured at one end to said reel and at the other end to said switch, and a flexible cable extending from the switch to a fixed source of current supply.

JOHN W. PETERS.